(12) United States Patent
Dong et al.

(10) Patent No.: US 9,250,998 B2
(45) Date of Patent: Feb. 2, 2016

(54) CACHE STRUCTURE WITH PARITY-PROTECTED CLEAN DATA AND ECC-PROTECTED DIRTY DATA

(71) Applicant: QUALCOMM Incorporated, San Diego, CA (US)

(72) Inventors: Xiangyu Dong, San Diego, CA (US); Jungwon Suh, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 88 days.

(21) Appl. No.: 14/090,427

(22) Filed: Nov. 26, 2013

(65) Prior Publication Data

US 2015/0149865 A1    May 28, 2015

(51) Int. Cl.
G06F 11/10 (2006.01)
G06F 12/00 (2006.01)

(52) U.S. Cl.
CPC ............ *G06F 11/1064* (2013.01); *G06F 12/00* (2013.01)

(58) Field of Classification Search
CPC .................................................. G06F 11/1076
USPC ................................. 714/766, 758, 773, 57, 8
See application file for complete search history.

(56) References Cited

U.S. PATENT DOCUMENTS

| | | | |
|---|---|---|---|
| 7,437,597 B1 | 10/2008 | Kruckemyer et al. | |
| 7,606,980 B2 | 10/2009 | Qureshi et al. | |
| 8,095,831 B2 * | 1/2012 | Moyer et al. | 714/57 |
| 8,245,111 B2 | 8/2012 | Chishti et al. | |
| 8,291,305 B2 | 10/2012 | Moyer et al. | |
| 8,838,897 B2 * | 9/2014 | Hu et al. | 711/118 |
| 2008/0016393 A1 * | 1/2008 | Bose et al. | 714/8 |
| 2011/0307758 A1 | 12/2011 | Fillingim | |
| 2013/0007358 A1 * | 1/2013 | Hu et al. | 711/108 |
| 2013/0268822 A1 * | 10/2013 | Manoochehri et al. | 714/758 |

FOREIGN PATENT DOCUMENTS

WO    2013095525 A1    6/2013

OTHER PUBLICATIONS

Kim, Jangwoo et al., "Multi-bit Error Tolerant Caches Using Two-Dimensional Error Coding," 40th Annual IEEE/ACM International Symposium on Microarchitecture, 2007, pp. 197-209.
International Search Report and Written Opinion for International Application No. PCT/US2014/065516, ISA/EPO, Date of Mailing Mar. 9, 2015, 7 pages.

* cited by examiner

*Primary Examiner* — Fritz Alphonse
(74) *Attorney, Agent, or Firm* — Toler Law Group, PC

(57) ABSTRACT

A method includes generating error detection information associated with data to be stored at a cache in response to determining that the data is clean. The method also includes storing the clean data at a first region of the cache. The method further includes generating error correction information associated with data to be stored at the cache in response to determining that the data is dirty. The method also includes storing the dirty data at a second region of the cache.

29 Claims, 5 Drawing Sheets

CACHE STRUCTURE WITH PARITY-PROTECTED CLEAN DATA AND ECC-PROTECTED DIRTY DATA

I. FIELD

The present disclosure is generally related to a cache structure with parity-protected clean data and ECC-protected dirty data.

II. DESCRIPTION OF RELATED ART

Advances in technology have resulted in smaller and more powerful computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and Internet protocol (IP) telephones, can communicate voice and data packets over wireless networks. Further, many such wireless telephones include other types of devices that are incorporated therein. For example, a wireless telephone can also include a digital still camera, a digital video camera, a digital recorder, and an audio file player. Also, such wireless telephones can process executable instructions, including software applications, such as a web browser application, that can be used to access the Internet. As such, these wireless telephones can include significant computing capabilities.

Wireless telephones may include memory systems to store data. Data caches in a memory system may utilize error correction code (ECC) techniques to correct errors that are associated with data stored in the data caches. However, ECC techniques may increase an amount of overhead at the data caches. For example, 8 bytes of ECC bits may protect a 64-byte cache line in a data cache. While ECC bits may be used to correct errors in data, data correction may not be needed in instances when errors are not present. Thus, data caches may reserve portions of cache lines for error correcting ECC bits when errors are not present.

III. SUMMARY

A data cache in accordance with the present disclosure conserves overhead by using error detection information (e.g., one or more parity bits) for data in a first region of the data cache and error-correction information, such as error correction code (ECC) bits, for data in a second region of the data cache. For example, in a system where data stored at a main memory is to be ECC-protected, cached data to be written to the main memory (e.g., "dirty" data) may be stored in an ECC-protected region of the data cache. Data that is not scheduled to be written to the main memory (e.g., "clean" data) may be parity-protected (which has less overhead than ECC protection). If parity information indicates an error (e.g., data corruption) is associated with the data, the data may be re-read from the main memory. The techniques described herein may enable decreased cache overhead and improved performance (e.g., by reducing a number of ECC decoding operations), particularly for systems in which most cache operations include cache reads instead of cache writes (e.g., where most cached data is "clean").

In a particular embodiment, a method includes generating error detection information associated with data to be stored at a cache in response to determining that the data is clean. The method also includes storing the clean data at a first region of the cache. The method further includes generating error correction information associated with data to be stored at the cache in response to determining that the data is dirty. The method also includes storing the dirty data at a second region of the cache.

In another particular embodiment, an apparatus includes a processor and a memory storing instructions executable by the processor to perform operations. The operations include generating error detection information associated with data to be stored at a cache in response to determining that the data is clean. The operations also include storing the clean data at a first region of the cache. The operations further include generating error correction information associated with data to be stored at the cache in response to determining that the data is dirty and storing the dirty data at a second region of the cache.

In another particular embodiment, an apparatus includes means for generating error detection information associated with data to be stored at a cache in response to determining that the data is clean. The apparatus also includes means for storing the clean data at a first region of the cache. The apparatus further includes means for generating error correction information associated with data to be stored at the cache in response to determining that the data is dirty. The apparatus also includes means for storing the dirty data at a second region of the cache.

In another particular embodiment, a non-transitory computer-readable storage medium includes instructions that, when executed by a processor, cause the processor to generate error detection information associated with data to be stored at a cache in response to determining that the data is clean. The instructions also cause the processor to store the clean data at a first region of the cache. The instructions also cause the processor to generate error correction information associated with data to be stored at the cache in response to determining that the data is dirty. The instructions also cause the processor to store the dirty data at a second region of the cache.

In another particular embodiment, a method includes receiving design information representing at least one physical property of a semiconductor device. The semiconductor device includes a processor and a memory storing instructions executable by the processor to perform operations. The operations include generating error detection information associated with data to be stored at a cache in response to determining that the data is clean. The operations also include storing the clean data at a first region of the cache. The operations further include generating error correction information associated with data to be stored at the cache in response to determining that the data is dirty and storing the dirty data at a second region of the cache. The method further includes transforming the design information to comply with a file format and generating a data file (e.g., a GDSII format or GERBER format) including the transformed design information.

In another particular embodiment, a method includes a step for generating error detection information associated with data to be stored at a cache in response to determining that the data is clean. The method also includes a step for storing the clean data at a first region of the cache. The method further includes a step for generating error correction information associated with data to be stored at the cache in response to determining that the data is dirty. The method also includes a step for storing the dirty data at a second region of the cache.

One particular advantage provided by at least one of the disclosed embodiments is decreased cache overhead and improved performance by reducing a number of error correcting code (ECC) decoding operations. Other aspects, advantages, and features of the present disclosure will become apparent after review of the entire application, including the following sections: Brief Description of the Drawings, Detailed Description, and the Claims.

IV. BRIEF DESCRIPTION OF THE DRAWINGS

Figure 4:
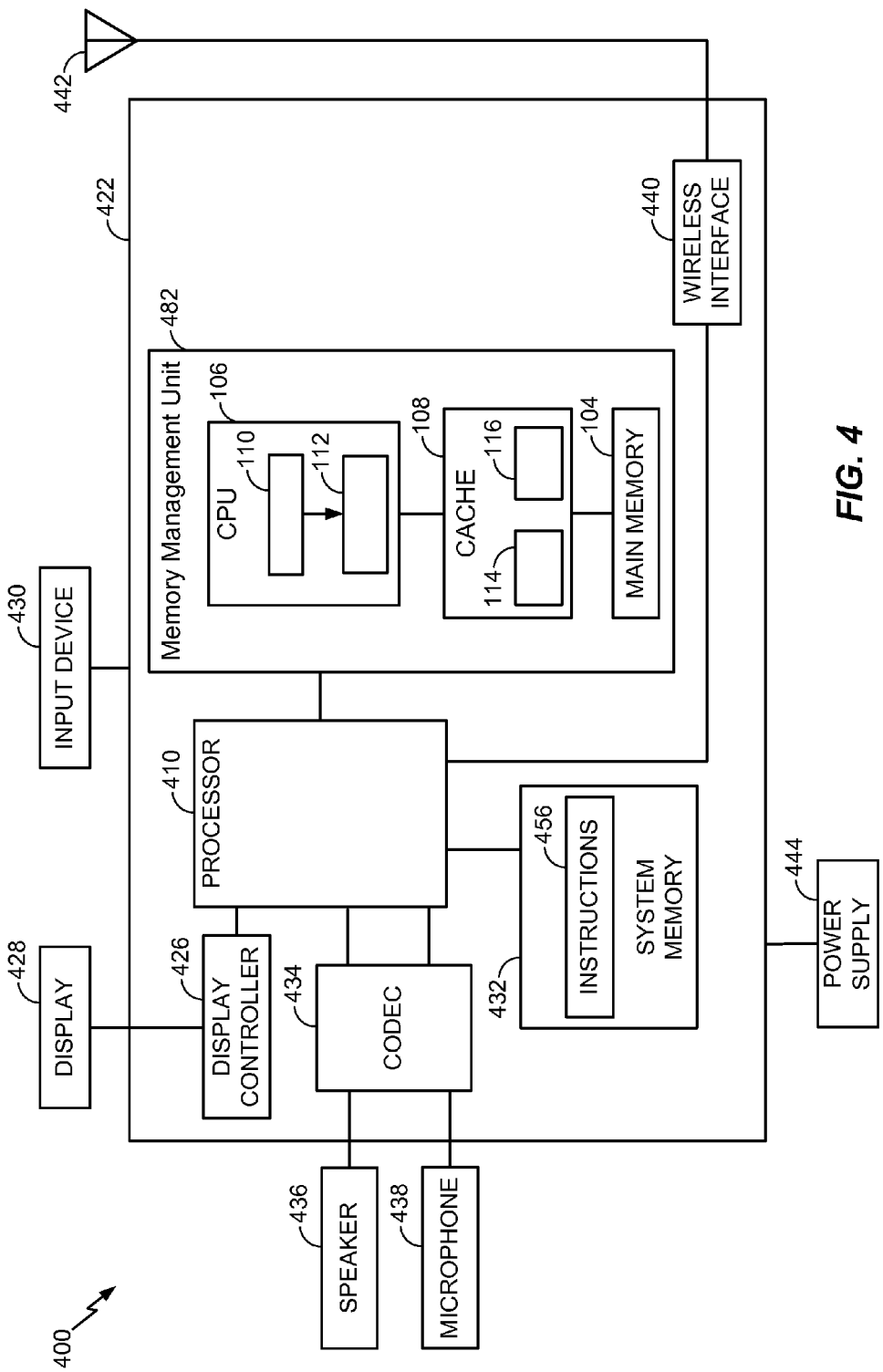
Figure 5:
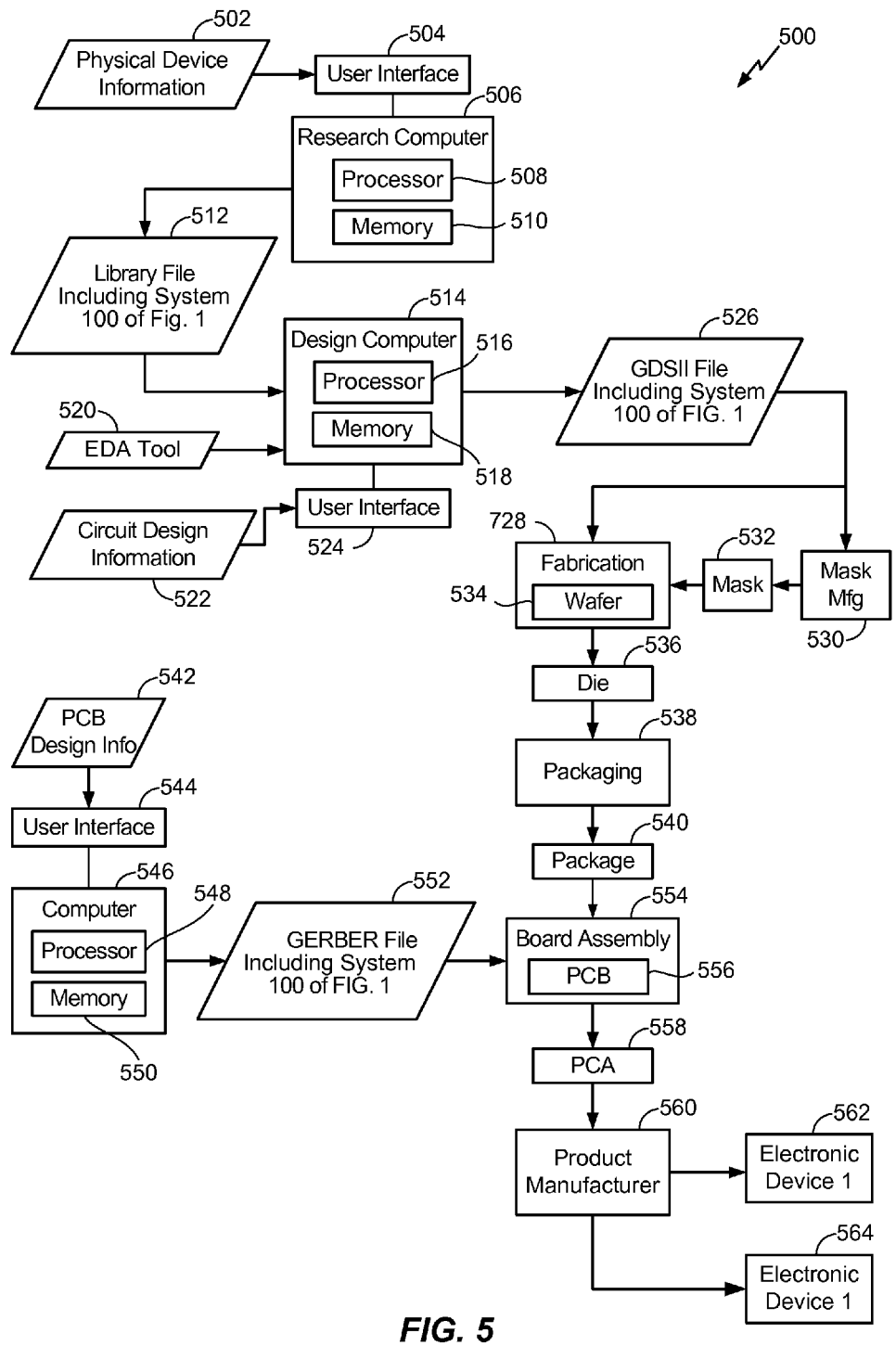

FIG. 4 is a block diagram of a wireless device including components that are operable to store clean data at a first region of a cache and to store dirty data at a second region of the cache; and FIG. 5 is a data flow diagram of a particular illustrative embodiment of a manufacturing process to manufacture electronic devices that include components that are operable to store clean data at a first region of a cache and to store dirty data at a second region of the cache.

V. DETAILED DESCRIPTION

Figure 1:
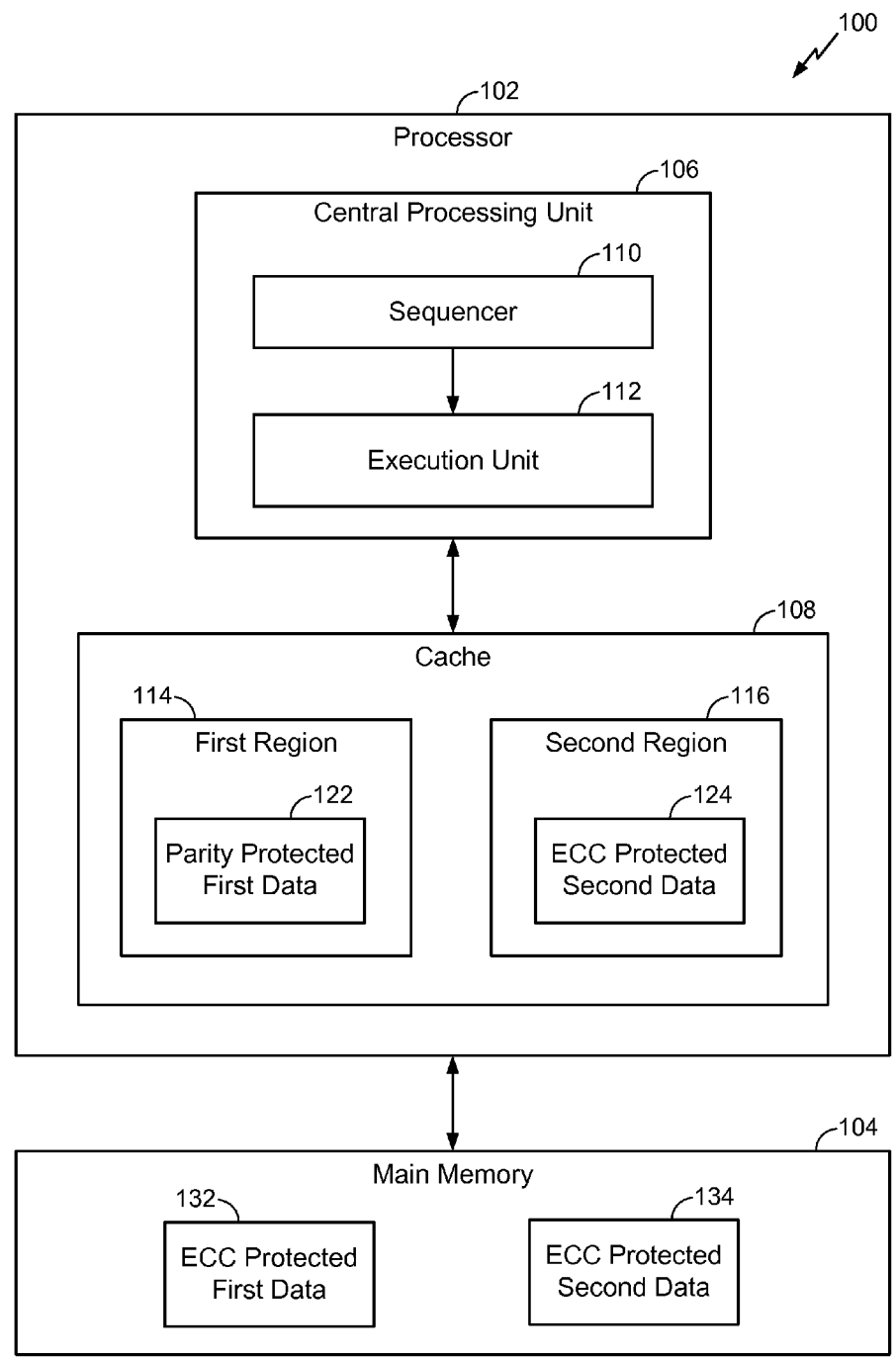
FIG. 1 is a block diagram of a particular illustrative embodiment of a system that is operable to store clean data at a first region of a cache and to store dirty data at a second region of the cache.

Referring to FIG. 1, a particular illustrative embodiment of a system 100 that is operable to store clean data at a first region of a cache and to store dirty data at a second region of the cache is shown. The system 100 includes a processor 102 coupled to a main memory 104.

The processor 102 includes a central processing unit (CPU) 106 and a cache 108 (e.g., a data cache). The cache 108 includes a first region 114 and a second region 116. The first region 114 of the cache 108 may be configured to store "clean" data, and the second region of the cache may be configured to store "dirty" data. As used herein, "clean" data may correspond to particular data that has a similar data value in different memory hierarchies of the system 100, and "dirty" data may correspond to particular data that has different data values in different memory hierarchies of the system 100. For example, data stored in the cache 108 may be a copy of particular data stored in the main memory 104. When a data value of the data stored in the cache 108 is equal to a data value of the copy stored in the main memory 104, the data stored in the cache 108 is clean data. When a data value of the data stored in the cache 108 is different than a data value of the copy stored in the main memory 104, the data stored in the cache 108 is dirty data.

The first region 114 may be reserved for error detection-enabled data and the second region may be reserved for error correction-enabled data. For example, the first region 114 may include one or more parity bits to protect first data (e.g., clean data) stored in the first region 114. Thus, the first data stored in the first region 114 may be parity protected first data 122 (e.g., error detection-enabled data). The second region 116 may include error correction code (ECC) bits to protect second data (e.g., dirty data) stored in the second region 116. Thus, the second data stored in the second region 116 may be ECC protected second data 124 (e.g., error correction-enabled data).

The first region 114 of the cache 108 may include a first number of bits (e.g., overhead bits) to protect data (e.g., clean data) stored in the first region 114, and the second region 116 of the cache 108 may include a second number of bits to protect data (e.g., dirty data) stored in the second region 116. The first number of bits may be less than the second number of bits. Thus, a physical size of the first region 114 may be smaller than a physical size of the second region 116 because the second region 116 may require more overhead (e.g., a greater number of bits) to protect data. As a non-limiting example, a 64-byte cache line in the second region 116 may utilize eight bytes of ECC bits to yield a 12.5% data overhead (e.g., $\frac{1}{8}$). However, a 64-byte cache line in the first region 114 may utilize one parity bit to yield approximately a 0.195% data overhead (e.g., $\frac{1}{512}$).

The CPU 106 includes a sequencer 110 coupled to an execution unit 112. The sequencer 110 may be configured to select particular data to be read or modified. For example, the sequencer 110 may select the parity protected first data 122 stored in the first region 114 of the cache 108 for a read operation or a write operation. Alternatively, the sequencer 110 may select the ECC protected second data 124 stored in the second region 116 of the cache 108 for a read operation or a write operation. The execution unit 112 may be configured to read or modify the data selected by the sequencer 110. For example, the execution unit 112 may be configured to perform a read operation or a write operation on the parity protected first data 122 stored in the first region 114 of the cache 108. Alternatively, the execution unit 112 may be configured to perform a read operation or a write operation on the ECC protected second data 124 stored in the second region 116 of the cache 108.

The main memory 104 may correspond to a coherence domain that is accessible to multiple processors in a multi-core processor system and/or accessible to other caches. For example, the system 100 may include additional processors (not shown) and/or additional caches (not shown) that are coupled to the main memory 104. The additional processors may access and modify data stored in the main memory 104. The main memory 104 may include ECC protected first data 132 and ECC protected second data 134. The ECC protected first data 132 may correspond to the clean data stored in the first region 114 of the cache 108. However, the ECC protected first data 132 may have ECC bits added to the clean data as opposed to one or more parity bits. The ECC protected second data 134 may correspond to the ECC protected second data 124 in the second region 116 of the cache 108. For example, the ECC protected second data 134 in the main memory 104 may be a copy of the ECC protected second data 124 stored in the second region 116 of the cache 108.

During operation, the processor 102 may determine whether particular data is clean or dirty. Data may be clean when the data has not undergone a write operation while stored at the cache 108, and data may be dirty when the data has undergone a write operation while stored at the cache 108. For example, data that has not undergone a write operation while stored at the cache 108 (e.g., the parity protected first data 122) may have an identical value as a copy of corresponding data stored at the main memory 104 (e.g., the ECC protected first data 132). Data that has undergone a write operation while stored at the cache 108 may have a different value than a copy of corresponding data stored at the main memory 104 and may need to be written to the main memory 104. The main memory 104 may be a coherence domain (e.g., accessible to additional processors).

The processor 102 may set a first indication that particular data is associated with a clean state in response to determining that the particular data is clean, or the processor 102 may set a second indication that particular data is associated with a dirty state in response to determining that the particular data is dirty. In response to determining that the particular data is clean, the processor 102 may generate error detection information associated with the particular data and store the particular data (and the error detection information) at the first region 114 of the cache 108. For example, the processor 102 may generate one or more parity bits to detect an error associated with the particular data and may store the particular data (and the parity bit(s)) in the first region 114 of the cache 108 as the parity protected first data 122. In response to determining that the particular data is dirty, the processor 102 may generate error correction information associated with the particular data and store the particular data (and the error correction information) at the second region 116 of the cache 108. For example, the processor 102 may generate ECC bits to correct errors associated with the particular data and may store the particular data and the ECC bits in the second region 116 of the cache 108 as the ECC protected second data 124.

During a read operation, the processor 102 may determine whether particular data is accessible from the cache 108 or if the particular data needs to be retrieved from the main memory 104. For example, the processor 102 may retrieve the particular data from the main memory 104 in response to a determination that the particular data is not stored in the first region 114 or the second region 116 of the cache 108 (e.g., in response to a read miss). After retrieving the particular data, the processor 102 may fill a data array in the first region 114 of the cache 108 with the particular data and determine one or more parity bits for the particular data. After determining the one or more parity bits, the processor 102 may add the one or more parity bits to the particular data in the data array.

In response to a determination that the particular data is stored at the first region 114 (e.g., a read hit), the processor 102 may determine whether a parity of the particular data indicates an error. For example, if the particular data is the parity protected first data 122, the processor 102 may evaluate the one or more parity bits associated with the first data 122 to determine whether the parity protected first data 122 has an error. If the one or more parity bits do not indicate an error, the processor 102 may use the parity protected first data 122 from the first region 114 of the cache 108. If the one or more parity bits indicate an error, the processor 102 may retrieve the ECC protected first data 132 from the main memory 104 because the one or more parity bits are typically insufficient to correct the error.

In response to a determination that the particular data is stored at the second region 116 (e.g., a read hit), the processor 102 may read the particular data from the second region 116. For example, if the particular data is the ECC protected second data 124, the processor may read the ECC protected second data 124 directly from the second region 116 of the cache 108 because the ECC bits may correct errors associated with the data.

During a write operation, the processor 102 may determine whether the particular data to be modified is located in the cache 108 (e.g., a write hit). In response to a determination that the particular data is not located in the cache 108 (e.g., a write miss), the processor 102 may select a particular cache line in the second region 116, calculate ECC bits for the data to be written, and fill (e.g., write to) a portion of the particular cache line with the data and the ECC bits. Prior to writing the data to the particular cache line in the second region 116, the processor 102 may invalidate prior data stored at the particular cache line and "move" the prior data to the main memory 104.

In response to a write hit in the first region 114, the processor 102 may invalidate the particular data in the first region 114 and write the particular data to the second region 116. For example, the processor 102 may select a particular cache line in the second region 116, calculate ECC bits for the data to be written, and fill a portion of the particular cache line in the second region 116 with the data and the ECC bits. In response to a write hit in the second region 116, the processor 102 may write directly to the hit cache line in the second region 116.

The system 100 of FIG. 1 may reduce an amount of overhead data (e.g., reduce an amount of ECC bits) stored at the cache 108 to protect data. For example, fewer parity bits may be used to protect data of a particular size as compared to an amount of ECC bits used to protect similar data. Because clean data is less likely to need error correction, parity bits may be used for clean data without substantially reducing operating efficiency or data reliability. The processor 102 may perform a parity check for data stored in the first region 114 (e.g., the parity protected first data 122) as opposed to performing an ECC operation that may be more time consuming. Upon detecting an error based on the parity check, the processor 102 may reload the data from main memory 102, which may include a similar latency as a standard ECC correction process. The system 100 may also reduce a chip size. For example, a smaller physical space may be used to store data in the first region 114 because data stored in the first region 114 may be associated with parity bits as opposed to more extensive ECC bits.

Figure 2:
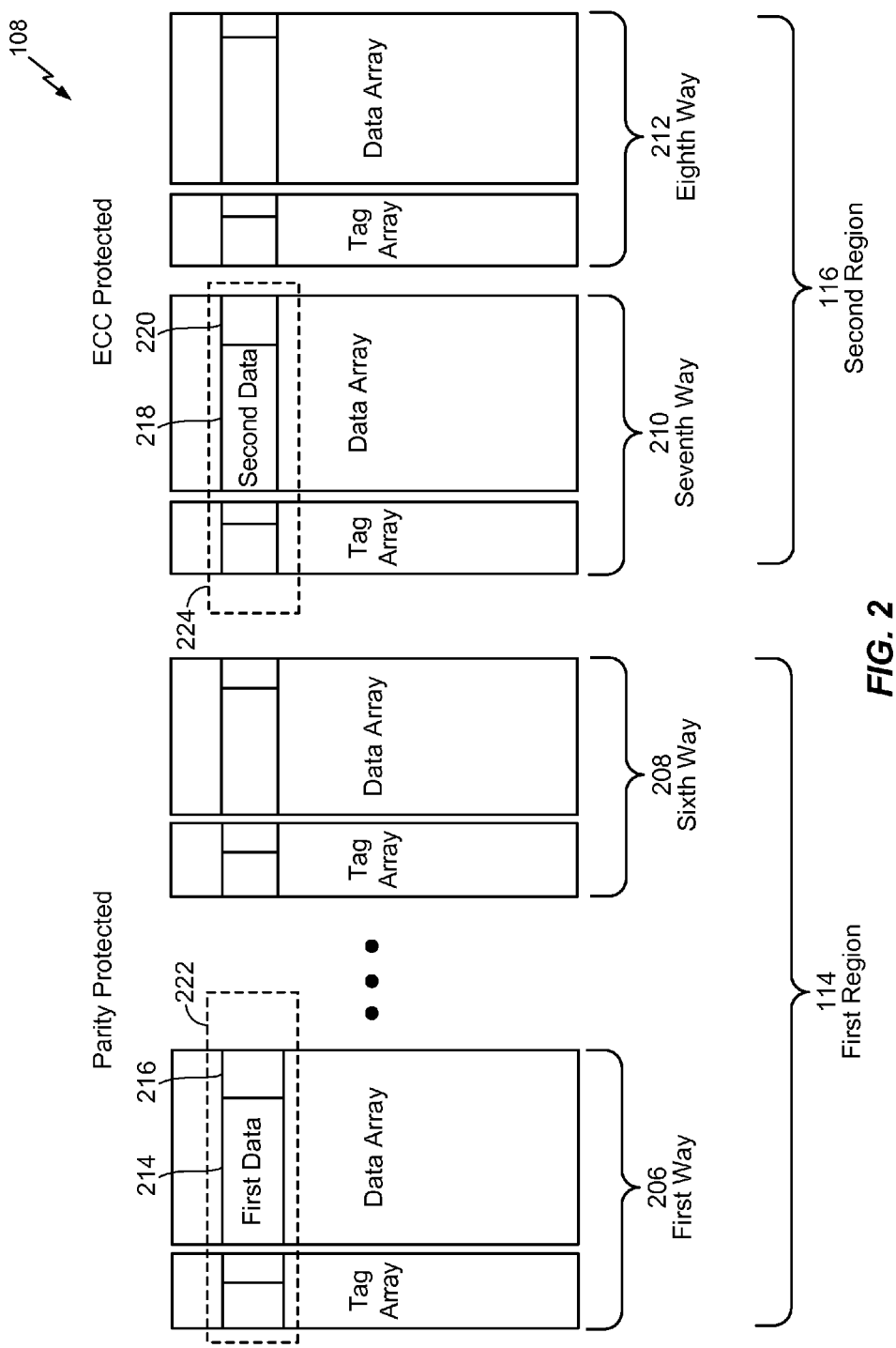
FIG. 2 is a diagram of a particular illustrative embodiment of a cache that is operable to store clean data at a first region and to store dirty data at a second region.

Referring to FIG. 2, a particular illustrative embodiment of a cache 108 that is operable to store clean data at a first region and to store dirty data at a second region is shown. The cache 108 includes the first region 114 and the second region 116. The first region 114 may include multiple cache ways that store data and error detection information associated with the data. For example, in the illustrated embodiment, the first region 114 may include six cache ways 206-208 that store data having error detection information (e.g., parity information). The second region 116 may include multiple cache ways 210, 212 that store data and error correction information associated with the data. For example, in the illustrated embodiment, the second region 116 may include two cache ways 210, 212 that store data having error correction code (ECC) protection. Although six cache ways 206-208 are depicted in the first region 114 and two cache ways 210, 212 are depicted in the second region 116, the number of cache ways within each region 114, 116 may vary based on system characteristics.

The first cache way 206 may include a first data array and a first tag array. The first data array may include first data 214 (e.g., data bits) and one or more parity bits 216 used for detecting errors in the first data 214. For example, a processor, such as the processor 102 of FIG. 1, may generate error detection information (e.g., the one or more parity bits 216) associated with the first data 214 to be stored at the cache 108. The processor may store the first data 214 at the first region 114 (e.g., at the first cache way 206) of the cache 108. In a particular embodiment, the first data 214 may correspond to the parity protected first data 122 of FIG. 1. The first region 114 of the cache 108 may include cache ways 206-208 that are reserved for clean data (e.g., the first data 214) and for error detection-enabled information (e.g., the one or more parity bits 216). Clean data corresponds to data that is coherent with respect to other memories and/or caches (e.g., data that has not undergone a write operation since being stored at the cache 108). After storing the first data 214, the processor may set a first indication that the first data 214 is associated with a clean state (e.g., has not undergone a write operation after being retrieved from the main memory, such as the main memory 104 of FIG. 1).

The seventh cache way 210 may include a seventh data array and a seventh tag array. The seventh data array may include second data 218 (e.g., data bits) and ECC bits 220 used for correcting errors in the second data 218. For example, the processor may generate error correction information (e.g., the ECC bits 220) associated with the second data 218 to be stored at the cache 108. The processor may store the second data 218 at the second region 116 (e.g., the seventh cache way 210) of the cache 108. In a particular embodiment, the second data 218 may correspond to the ECC protected second data 124 of FIG. 1. The second region 116 of the cache 108 may include cache ways 210, 212 that are reserved for dirty data (e.g., the second data 218) and for error correction-enabled data (e.g., the ECC bits 220). Dirty data corresponds to data that is incoherent with respect to other memories and/or caches (e.g., data that has undergone a write operation since being stored at the cache 108). After storing the second data 218, the processor may set a second indication that the second data 218 is associated with a dirty state. Dirty data may need to be written to the main memory before additional operations are performed on the dirty data (e.g., to enable data coherency).

The first data 214 may be stored in a first cache line 222 of the first way 206 and the second data 218 may be stored in a second cache line 224 of the seventh way 210. If the first data 214 and the second data 218 are the same size (e.g., include a common number of bits), the second cache line 224 may be larger than the first cache line 222 because of increased overhead. For example, the first cache line 222 may include a first region to accompany a parity bit 216 to protect the first data 214 and the second cache line 224 may provide a larger second region to accompany multiple ECC bits 220 to protect the second data 218. Thus, the overall size of the cache 108 may be reduced by dedicating the first region 114 (with smaller cache lines) to clean data that does not require ECC protection as opposed to making each cache line large enough to support ECC protection.

During a read operation, the processor may determine that particular data needs to be accessed from the main memory. For example, the processor may access the particular data from the main memory in response to a determination that the particular data is not stored in the first region 114 or the second region 116 (e.g., in response to a read miss). The processor may select a particular cache line (e.g., the first cache line 222) at the first region 114 and retrieve the particular data (e.g., the first data 214) from a memory location (e.g., the main memory). After retrieving the first data 214, the processor may fill a first portion of the first cache line 222 with the first data 214 and determine the one or more parity bits 216 for the first data 214. After determining the one or more parity bits 216, the processor may fill a second portion of the first cache line 222 with the one or more parity bits 216.

In response to a determination that the particular data is stored at the first region 114 (e.g., a read hit), the processor may determine whether a parity of the particular data indicates an error. For example, in response to determining that the first data 214 (e.g., the particular data) is stored at a first cache line 222 in the first cache way 206, the processor may evaluate the one or more parity bits 216 associated with the first data 214 to determine whether the first data 214 has an error. If the one or more parity bits do not indicate an error, the processor may use the first data 214 from the first cache line 222. If the one or more parity bits 216 indicate an error, the error detection information (e.g., the one or more parity bits 216) may be insufficient to correct the error associated with the first data 214. As a result, the processor may invalidate the first cache line 222 and retrieve the first data 214 (without error) from the main memory. After retrieving the first data 214, the processor may fill a first portion of the first cache line 222 with the first data 214 and with newly-determined error detection information.

In response to a determination that the particular data is stored at the second region 116 (e.g., a read hit), the processor may read the particular data from a corresponding cache line within the second region 116. For example, in response to determining that the second data 218 (e.g., the particular data) is stored at a second cache line 224 in the seventh cache way 210, the processor may read the second data 218 from the second cache line 224. The ECC bits 220 stored at the second cache line 224 may correct errors associated with the second data 218.

During a write operation (e.g., in response to a write miss), the processor may select a particular cache line in the cache 108 and write data to the particular cache line. For example, the processor may write the second data 218 to the second cache line 224. Prior to writing the second data 218 to the second cache line 224, the processor may invalidate prior data stored at the second cache line 224 and "move" the prior data to the main memory. In response to a write hit, the processor may check if the hit cache line is in the first region 114 or the second region 116. If the hit cache line is in the second region 116 (e.g. cache line 224), then the write operation can be directly served from that cache line 224. Otherwise, if the hit cache line is in the first region 114 (e.g. cache line 222), the write hit operation is converted into a write miss operation, and the data in that cache line 222 is invalidated.

Storing clean data at the first region 114 of the cache 108 and storing dirty data at the second region 116 of the cache 108 may reduce an amount of overhead data (e.g., reduce an amount of ECC bits) stored at the cache 108. For example, using parity bits for clean data (as opposed to ECC bits) may decrease cache overhead and improve performance by reducing a number of error correcting code (ECC) decoding operations.

Figure 3:
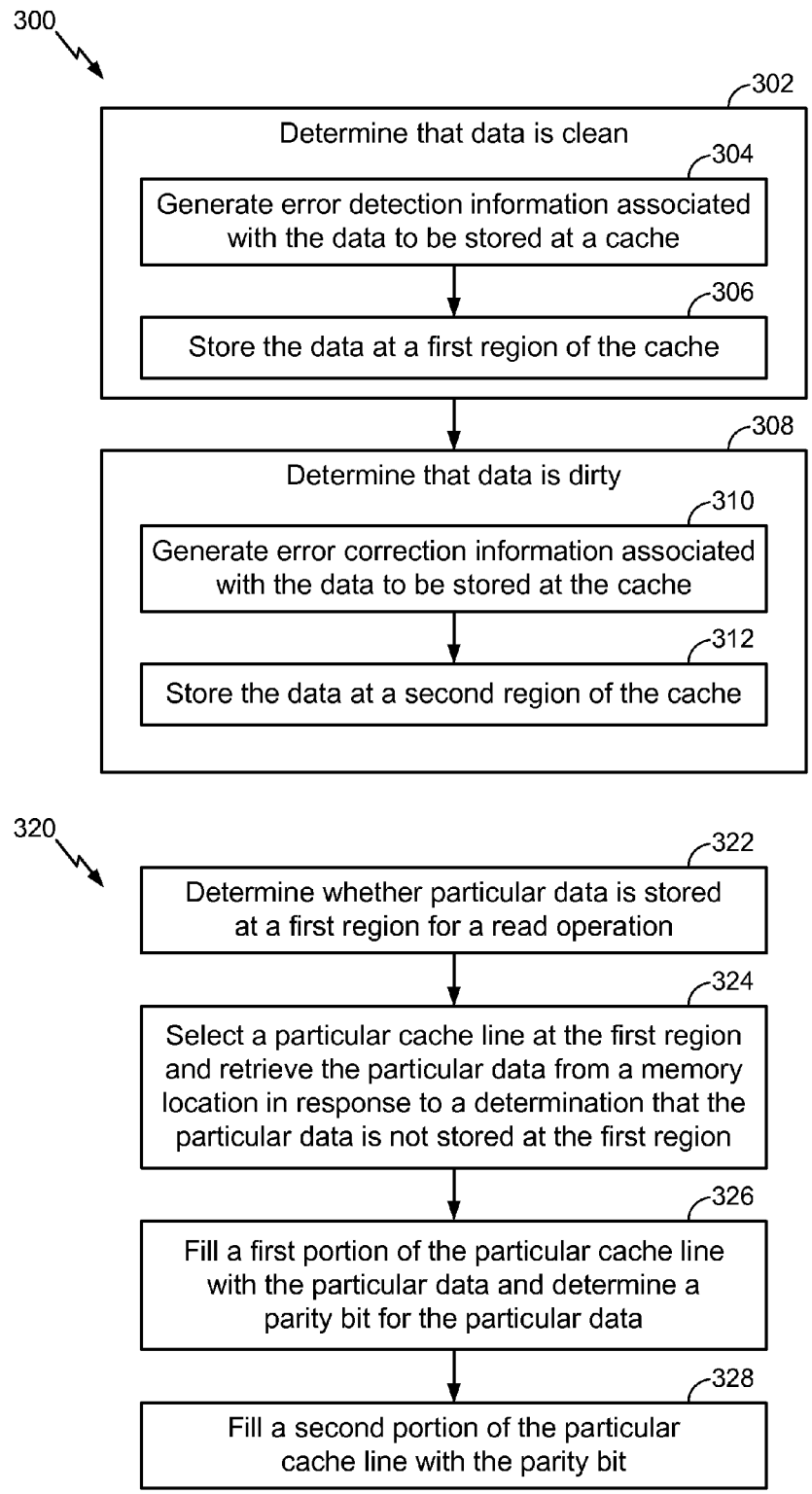
FIG. 3 is a flowchart of particular embodiments of methods of storing clean data at a first region of a cache and storing dirty data at a second region of the cache.

Referring to FIG. 3, particular embodiments of methods 300, 320 of storing clean data at a first region of a cache and storing dirty data at a second region of the cache is shown. The methods 300, 320 may be performed by the system 100 of FIG. 1 using the components of the cache 108 as described with respect to FIG. 2.

The first method 300 includes determining whether data is clean or dirty, at 302 and 308. In response to a determination that the data is clean, at 302, error detection information associated with the data may be generated to be stored at a cache, at 304. For example, the processor 102 of FIG. 1 may generate error detection information (e.g., the one or more parity bits 216 of FIG. 2) associated with the first data 214. The data may be stored at a first region of the cache, at 306. For example, in FIG. 1, the processor 102 may store the first data 214 (e.g., the parity protected first data 122) at the first region 114 of the cache 108.

In response to a determination that the data is dirty, at 308, error correction information associated with the data may be generated to be stored at the cache, at 310. For example, the processor 102 of FIG. 1 may generate error correction information (e.g., the ECC bits 220 of FIG. 2) to correct errors associated with the second data 218. The data may be stored at a second region of the cache, at 312. For example, in FIG. 1, the processor 102 may store the second data 218 (e.g., the ECC protected second data 124) in the second region 116 of the cache 108. In a particular embodiment, the cache 108 (e.g., a first location) may be located at a first hierarchy level of a memory system and the main memory 104 (e.g., a second location) of FIG. 1 may be located at a second hierarchy level of the memory system. The first hierarchy level may correspond to a data storage location that is accessible to a single processor, and the second hierarchy level may correspond to a data storage location that is accessible to multiple processors (e.g., a coherence domain).

In a particular embodiment, the first method 300 may include setting a first indication that the data is associated with a clean state in response to determining that the data is clean. For example, the processor 102 may set a first indication that the first data 214 is associated with a clean state in response to determining that the first data 214 is clean. The processor 102 may flag the first data 214 as not having undergone a write operation while located at the cache 108. The method 300 may also include setting a second indication that the data is associated with a dirty state in response to determining that the data is dirty. For example, the processor 102 may set a second indication that the second data 218 is associated with a dirty state in response to determining that the second data 218 is dirty. The processor 102 may flag the second data 218 as having undergone a write operation while stored at the cache 108.

In a particular embodiment, the first method 300 may include selecting a particular cache line in the second region for a write operation and filling the particular cache line with particular data according to the write operation. For example, the processor 102 may select the second cache line 224 for a write operation and fill the second cache line 224 with the second data 218 according to the write operation. Prior to filing the particular cache line, the method 300 may include invalidating prior data stored at the particular cache line and writing the prior data to a memory location (e.g., the main memory 104).

The second method 320 includes determining whether particular data is stored at the first region 114 for a read operation, at 322. In response to a determination that the particular data is not stored at the first region 114, the second method 320 may include selecting a particular cache line at the first region 114 and retrieving the particular data from a memory location, at 324. For example, the processor 102 of FIG. 1 may select the first cache line 222 of FIG. 2 and retrieve the first data 214 from the main memory 104 of FIG. 1. The second method 320 may also include filling a first portion of the particular cache line with the particular data and determining a parity bit for the particular data, at 326. For example, the processor 102 may fill a portion of the first cache line 222 with the first data 214 and determine one or more parity bits 216 for the first data 214. The second method 320 may also include filling a second portion of the particular cache line with the parity bit, at 328. For example, the processor 102 may fill a second portion of the first cache line 222 with the one or more parity bits 216.

In response to a determination that the particular data is stored at the first region 114, the second method 320 may include determining whether a parity of the particular data indicates an error. For example, the processor 102 may determine whether the one or more parity bits 216 indicate that an error is associated with the first data 214. The second method 320 may also include reading the particular data from a particular cache line in response to a determination that the parity does not indicate and error, or invalidating the particular cache line in response to a determination that the parity indicates an error. For example, the processor 102 may read the first data 214 from the first cache line 222 in response to a determination that the one or more parity bits 216 do not indicate that an error is associated with the first data 214. Alternatively, the processor 102 may invalidate the first cache line 222 in response to a determination that the one or more parity bits 216 indicate that an error is associated with the first data 214. In response to invalidating the particular cache line, the second method 320 may include retrieving the particular data from a memory location and filling a first portion of the particular cache line with the particular data. For example, the processor 102 of FIG. 1 may retrieve the ECC protected first data 132 from the main memory 104 and fill a first portion of the first cache line 222 with data from the ECC protected first data 132. The method 300 may also include determining a parity bit for the particular data and filling a second portion of the particular cache line with the parity bit.

The methods 300, 320 of FIG. 3 may reduce an amount of overhead data (e.g., reduce an amount of ECC bits) stored at the cache 108 to protect data. For example, fewer parity bits may be used to protect data of a particular size when compared to an amount of ECC bits used to protect similar data. Because clean data is less likely to need error correction, parity bits may be used for clean data without substantially reducing operating efficiency or data reliability.

Referring to FIG. 4, a block diagram of a wireless device 400 including components that are operable to store clean data at a first region of a cache and to store dirty data at a second region of the cache is shown. The device 400 includes a processor 410, such as a digital signal processor (DSP), coupled to a system memory 432. A memory management unit 482 may be coupled to the processor 410. The memory management unit 482 may correspond to the processor 102 of FIG. 1. For example, the memory management unit 482 may include the CPU 106 of FIG. 1, the main memory 104 of FIG. 1, and the cache 108 of FIGS. 1-2. In a particular embodiment, the memory management unit 482 may be configured to perform the methods 300, 320 of FIG. 3.

FIG. 4 also shows a display controller 426 that is coupled to the processor 410 and to a display 428. A coder/decoder (CODEC) 434 can also be coupled to the processor 410. A speaker 436 and a microphone 438 can be coupled to the CODEC 434. FIG. 4 also indicates that a wireless controller 440 can be coupled to the processor 410 and to an antenna 442.

The system memory 432 may be a tangible non-transitory processor-readable storage medium that includes executable instructions 456. The instructions 456 may be executed by a processor, such as the processor 410 or the memory management unit 482, to generate error detection information (e.g., one or more parity bits) associated with data to be stored at the cache 108 in response to determining that the data is clean. The data may be stored at the first region 114 of the cache 108 along with the error detection information in response to a determination that the data is clean. The instruction 456 may also be executable to generate error correction information (e.g., ECC bits) associated with data to be stored at the cache 108 in response to determining that the data is dirty. The data may be stored at the second region 116 of the cache 108 along with the error correction information in response to a determination that the data is dirty.

In a particular embodiment, the processor 410, the display controller 426, the system memory 432, the CODEC 434, and the wireless controller 440 are included in a system-in-package or system-on-chip device 422. In a particular embodiment, an input device 430 and a power supply 444 are coupled to the system-on-chip device 422. Moreover, in a particular embodiment, as illustrated in FIG. 4, the display 428, the input device 430, the speaker 436, the microphone 438, the wireless antenna 442, and the power supply 444 are external to the system-on-chip device 422. However, each of the display 428, the input device 430, the speaker 436, the microphone 438, the wireless antenna 442, and the power supply 444 can be coupled to a component of the system-on-chip device 422, such as an interface or a controller.

In conjunction with the described embodiments, an apparatus is disclosed that includes means for generating error detection information associated with data to be stored at a cache in response to determining that the data is clean. For example, the means for generating the error detection information may include the processor 102 of FIG. 1, the processor 410 programmed to execute the instructions 456 of FIG. 4, one or more other devices, circuits, modules, or instructions to generate error detection information, or any combination thereof.

The apparatus also includes means for storing the data in a first region of the cache. For example, the means for storing may include the processor 102 of FIG. 1, the ways 206-208 in the first region 114 of FIG. 2, the processor 410 programmed to execute the instructions 456 of FIG. 4, one or more other devices, circuits, modules, or instructions to store the data, or any combination thereof.

The apparatus also includes means for generating error correction information associated with data to be stored at the cache in response to determining that the data is dirty. For example, the means for generating the error correction information may include the processor 102 of FIG. 1, the processor 410 programmed to execute the instructions 456 of FIG. 4, one or more other devices, circuits, modules, or instructions to generate error correction information, or any combination thereof.

The apparatus also includes means for storing the data in a second region of the cache. For example, the means for storing may include the processor 102 of FIG. 1, the ways 210-212 in the second region 116 of FIG. 2, the processor 410 programmed to execute the instructions 456 of FIG. 4, one or more other devices, circuits, modules, or instructions to store the data, or any combination thereof.

The foregoing disclosed devices and functionalities may be designed and configured into computer files (e.g. RTL, GDSII, GERBER, etc.) stored on computer readable media. Some or all such files may be provided to fabrication handlers who fabricate devices based on such files. Resulting products include semiconductor wafers that are then cut into semiconductor die and packaged into a semiconductor chip. The chips are then employed in devices described above. FIG. 5 depicts a particular illustrative embodiment of an electronic device manufacturing process 500.

Physical device information 502 is received at the manufacturing process 500, such as at a research computer 506. The physical device information 502 may include design information representing at least one physical property of a semiconductor device that includes the system 100 of FIG. 1, the cache 108 of FIG. 2, the instructions 456 executable by the processor 410 of FIG. 4, or any combination thereof. For example, the physical device information 502 may include physical parameters, material characteristics, and structure information that is entered via a user interface 504 coupled to the research computer 506. The research computer 506 includes a processor 508, such as one or more processing cores, coupled to a computer readable medium such as a memory 510. The memory 510 may store computer readable instructions that are executable to cause the processor 508 to transform the physical device information 502 to comply with a file format and to generate a library file 512.

In a particular embodiment, the library file 512 includes at least one data file including the transformed design information. For example, the library file 512 may include a library of semiconductor devices including the system 100 of FIG. 1, components of the system 100 of FIG. 1, the cache 108 of FIG. 2, the processor 410 of FIG. 4, the memory management unit 482 of FIG. 4, or any combination thereof, that is provided for use with an electronic design automation (EDA) tool 520.

The library file 512 may be used in conjunction with the EDA tool 520 at a design computer 514 including a processor 516, such as one or more processing cores, coupled to a memory 518. The EDA tool 520 may be stored as processor executable instructions at the memory 518 to enable a user of the design computer 514 to design a device that includes the system 100 of FIG. 1, components of the system 100 of FIG. 1, the cache 108 of FIG. 2, the processor 410 of FIG. 4, the memory management unit 482 of FIG. 4, or any combination thereof. For example, a user of the design computer 514 may enter circuit design information 522 via a user interface 524 coupled to the design computer 514. The circuit design information 522 may include design information representing at least one physical property of a semiconductor device that includes the system 100 of FIG. 1, components of the system 100 of FIG. 1, the cache 108 of FIG. 2, the processor 410 of FIG. 4, the memory management unit 482 of FIG. 4, or any combination thereof. To illustrate, the circuit design property may include identification of particular circuits and relationships to other elements in a circuit design, positioning information, feature size information, interconnection information, or other information representing a physical property of a semiconductor device.

The design computer 514 may be configured to transform the design information, including the circuit design information 522, to comply with a file format. To illustrate, the file formation may include a database binary file format representing planar geometric shapes, text labels, and other information about a circuit layout in a hierarchical format, such as a Graphic Data System (GDSII) file format. The design computer 514 may be configured to generate a data file including the transformed design information, such as a GDSII file 526 that includes information describing a device that includes the system 100 of FIG. 1, components of the system 100 of FIG. 1, the cache 108 of FIG. 2, the processor 410 of FIG. 4, the memory management unit 482 of FIG. 4, or any combination thereof, and that also includes additional electronic circuits and components within the SOC.

The GDSII file 526 may be received at a fabrication process 528 to manufacture a semiconductor device that includes the system 100 of FIG. 1, components of the system 100 of FIG. 1, the cache 108 of FIG. 2, the processor 410 of FIG. 4, the memory management unit 482 of FIG. 4, or any combination thereof, according to transformed information in the GDSII file 526. For example, a device manufacture process may include providing the GDSII file 526 to a mask manufacturer 530 to create one or more masks, such as masks to be used with photolithography processing, illustrated as a representative mask 532. The mask 532 may be used during the fabrication process to generate one or more wafers 534, which may be tested and separated into dies, such as a representative die 536. The die 536 includes a circuit including the system 100 of FIG. 1, components of the system 100 of FIG. 1, the cache 108 of FIG. 2, the processor 410 of FIG. 4, the memory management unit 482 of FIG. 4, or any combination thereof.

The die 536 may be provided to a packaging process 538 where the die 536 is incorporated into a representative package 540. For example, the package 540 may include the single die 536 or multiple dies, such as a system-in-package (SiP) arrangement. The package 540 may be configured to conform to one or more standards or specifications, such as Joint Electron Device Engineering Council (JEDEC) standards.

Information regarding the package 540 may be distributed to various product designers, such as via a component library stored at a computer 546. The computer 546 may include a processor 548, such as one or more processing cores, coupled to a memory 550. A printed circuit board (PCB) tool may be stored as processor executable instructions at the memory 550 to process PCB design information 542 received from a user of the computer 546 via a user interface 544. The PCB design information 542 may include physical positioning information of a packaged semiconductor device on a circuit board, the packaged semiconductor device corresponding to the package 540 including the a device that includes the system 100 of FIG. 1, components of the system 100 of FIG. 1, the cache 108 of FIG. 2, the processor 410 of FIG. 4, the memory management unit 482 of FIG. 4, or any combination thereof.

The computer 546 may be configured to transform the PCB design information 542 to generate a data file, such as a GERBER file 552 with data that includes physical positioning information of a packaged semiconductor device on a circuit board, as well as layout of electrical connections such as traces and vias, where the packaged semiconductor device corresponds to the package 540 including the system 100 of FIG. 1, components of the system 100 of FIG. 1, the cache 108 of FIG. 2, the processor 410 of FIG. 4, the memory management unit 482 of FIG. 4, or any combination thereof. In other embodiments, the data file generated by the transformed PCB design information may have a format other than a GERBER format.

The GERBER file 552 may be received at a board assembly process 554 and used to create PCBs, such as a representative PCB 556, manufactured in accordance with the design information stored within the GERBER file 552. For example, the GERBER file 552 may be uploaded to one or more machines to perform various steps of a PCB production process. The PCB 556 may be populated with electronic components including the package 540 to form a representative printed circuit assembly (PCA) 558.

The PCA 558 may be received at a product manufacture process 560 and integrated into one or more electronic devices, such as a first representative electronic device 562 and a second representative electronic device 564. As an illustrative, non-limiting example, the first representative electronic device 562, the second representative electronic device 564, or both, may be selected from the group of a set top box, a music player, a video player, an entertainment unit, a navigation device, a communications device, a personal digital assistant (PDA), a fixed location data unit, and a computer, into which the system 100 of FIG. 1, components of the system 100 of FIG. 1, the cache 108 of FIG. 2, the processor 410 of FIG. 4, the memory management unit 482 of FIG. 4, or any combination thereof, or any combination thereof may be integrated into the first representative electronic device 562, the second representative electronic device 564, or both. As another illustrative, non-limiting example, one or more of the electronic devices 562 and 564 may be remote units such as mobile phones, hand-held personal communication systems (PCS) units, portable data units such as personal data assistants, global positioning system (GPS) enabled devices, navigation devices, fixed location data units such as meter reading equipment, or any other device that stores or retrieves data or computer instructions, or any combination thereof. Although FIG. 5 illustrates remote units according to teachings of the disclosure, the disclosure is not limited to these illustrated units. Embodiments of the disclosure may be suitably employed in any device which includes active integrated circuitry including memory and on-chip circuitry.

A device that includes the system 100 of FIG. 1, components of the system 100 of FIG. 1, the cache 108 of FIG. 2, the processor 410 of FIG. 4, the memory management unit 482 of FIG. 4, or any combination thereof, may be fabricated, processed, and incorporated into an electronic device, as described in the illustrative process 500. One or more aspects of the embodiments disclosed with respect to FIGS. 1-4 may be included at various processing stages, such as within the library file 512, the GDSII file 526, and the GERBER file 552, as well as stored at the memory 510 of the research computer 506, the memory 518 of the design computer 514, the memory 550 of the computer 546, the memory of one or more other computers or processors (not shown) used at the various stages, such as at the board assembly process 554, and also incorporated into one or more other physical embodiments such as the mask 532, the die 536, the package 540, the PCA 558, other products such as prototype circuits or devices (not shown), or any combination thereof. Although various representative stages of production from a physical device design to a final product are depicted, in other embodiments fewer stages may be used or additional stages may be included. Similarly, the process 500 may be performed by a single entity or by one or more entities performing various stages of the process 500.

Those of skill would further appreciate that the various illustrative logical blocks, configurations, modules, circuits, and algorithm steps described in connection with the embodiments disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A method for protecting data in a memory system comprising a cache, said method comprising:
in response to determining that data is clean:
generating error detection information associated with the data to be stored at the cache, wherein the cache corresponds to a first hierarchy level of the memory system and a second location of the memory system corresponds to a second hierarchy level of the memory system; and
storing the data at a first region of the cache; and
in response to determining that the data is dirty:
generating error correction information associated with the data to be stored at the cache; and
storing the data at a second region of the cache.

2. The method of claim 1, wherein the data is clean when a value of the data stored at the cache is equal to a value of data stored at the second location of the memory system.

3. The method of claim 1, wherein the data is dirty when a value of the data stored at the cache is different than a value of data stored at the second location of the memory system.

4. The method of claim 3, wherein the second location corresponds to a main memory.

5. The method of claim 1, wherein the first region corresponds to a first cache way reserved for clean data, and wherein the second region corresponds to a second cache way reserved for dirty data.

6. The method of claim 1, wherein a physical size of the first region is different than a physical size of the second region.

7. The method of claim 6, wherein the physical size of the first region is smaller than the physical size of the second region.

8. The method of claim 1, wherein the first region is reserved for error detection-enabled data, and wherein the second region is reserved for error correction-enabled data.

9. The method of claim 1, wherein the data is clean when the data has not undergone a write operation while stored at the cache, and wherein the data is dirty when the data has undergone a write operation while stored at the cache.

10. The method of claim 1, further comprising:
setting a first indication that the data is associated with a clean state in response to determining that the data is clean; and
setting a second indication that the data is associated with a dirty state in response to determining that the data is dirty.

11. The method of claim 1, wherein the error detection information includes a parity bit, and wherein the error correction information includes error correcting code (ECC) information.

12. The method of claim 11, wherein the error detection information is insufficient to correct an error associated with the data.

13. The method of claim 1, further comprising determining whether particular data is stored at the first region for a read operation.

14. The method of claim 13, further comprising, in response to a determination that the particular data is not stored at the first region:
selecting a particular cache line at the first region;
retrieving the particular data from a memory location;
filling a first portion of the particular cache line with the particular data;
determining a parity bit for the particular data; and
filling a second portion of the particular cache line with the parity bit.

15. The method of claim 13, further comprising, in response to a determination that the particular data is stored at the first region:
determining whether a parity of the particular data indicates an error;
reading the particular data from a particular cache line in response to a determination that the parity does not indicate an error, wherein the particular cache line stores the particular data at the first region; and
invalidating the particular cache line in response to a determination that the parity indicates an error.

16. The method of claim 15, further comprising, in response to invalidating the particular cache line:
retrieving the particular data from a memory location;
filling a first portion of the particular cache line with the particular data;
determining a parity bit for the particular data; and
filling a second portion of the particular cache line with the parity bit.

17. The method of claim 1, further comprising:
selecting a particular cache line for a write operation, wherein the particular cache line is in the second region; and
filling the particular cache line with particular data according to the write operation.

18. The method of claim 17, further comprising, prior to filling the particular cache line:
invalidating prior data stored at the particular cache line; and
writing the prior data to a memory location.

19. The method of claim 1, wherein generating the error detection information and generating the error correction information is performed at a processor integrated into an electronic device or a memory management unit integrated into an electronic device.

20. An apparatus comprising:
a processor; and
a memory system comprising a cache and a plurality of hierarchy levels, wherein the cache corresponds to a first hierarchy level of the memory system and a second location of the memory system corresponds to a second hierarchy level of the memory system, wherein the memory system stores instructions executable by the processor to perform operations comprising:
in response to determining that data is clean:
generating error detection information associated with the data to be stored at the cache; and
storing the data at a first region of the cache; and
in response to determining that the data is dirty:
generating error correction information associated with the data to be stored at the cache; and
storing the data at a second region of the cache.

21. The apparatus of claim 20, wherein the data is clean when a value of the data stored at the cache is equal to a value of data stored at the second location of the memory system.

22. The apparatus of claim 20, wherein the data is dirty when a value of the data stored at the cache is different than a value of data stored at the second location of a memory system.

23. The apparatus of claim 20, wherein the processor and the memory system are integrated into at least one semiconductor die.

24. The apparatus of claim 20, further comprising a device selected from a set top box, a music player, a video player, an entertainment unit, a navigation device, a communications device, a personal digital assistant (PDA), a fixed location data unit, or a computer, into which the processor and the memory system are integrated.

25. An apparatus for storing and protecting data, wherein the apparatus comprises a plurality of hierarchy levels, said apparatus comprising:
 means for caching data, the means for caching corresponding to a first hierarchy level of the apparatus;
 means for storing the data, the means for storing corresponding to a second hierarchy level of the apparatus;
 means for generating, in response to determining that the data is clean, error detection information associated with the data and for transmitting the data for storage at a first region of the means for caching; and
 means for generating, in response to determining that the data is dirty, error correction information associated with the data; and for transmitting the data for storage at a second region of the means for caching.

26. The apparatus of claim 25, further comprising a device selected from a set top box, a music player, a video player, an entertainment unit, a navigation device, a communications device, a personal digital assistant (PDA), a fixed location data unit, or a computer, into which the means for generating error detection information and the means for generating error correction information are integrated.

27. The apparatus of claim 25, integrated into at least one semiconductor device.

28. A non-transitory computer-readable storage medium comprising instructions that are executable by a processor coupled to a memory system comprising a cache and a plurality of hierarchy levels, wherein the cache corresponds to a first hierarchy level of the memory system and a second location of the memory system corresponds to a second hierarchy level of the memory system, wherein the instructions, when executed by the processor, cause the processor to:
 in response to determining that data is clean:
  generate error detection information associated with the data to be stored at the cache; and
  store the data at a first region of the cache; and
 in response to determining that the data is dirty:
  generate error correction information associated with the data to be stored at the cache; and
  store the data at a second region of the cache.

29. The non-transitory computer-readable storage medium of claim 28, wherein the processor is integrated into a set top box, a music player, a video player, an entertainment unit, a navigation device, a communications device, a personal digital assistant (PDA), a fixed location data unit, or a computer.

* * * * *